United States Patent Office 2,950,857
Patented Aug. 30, 1960

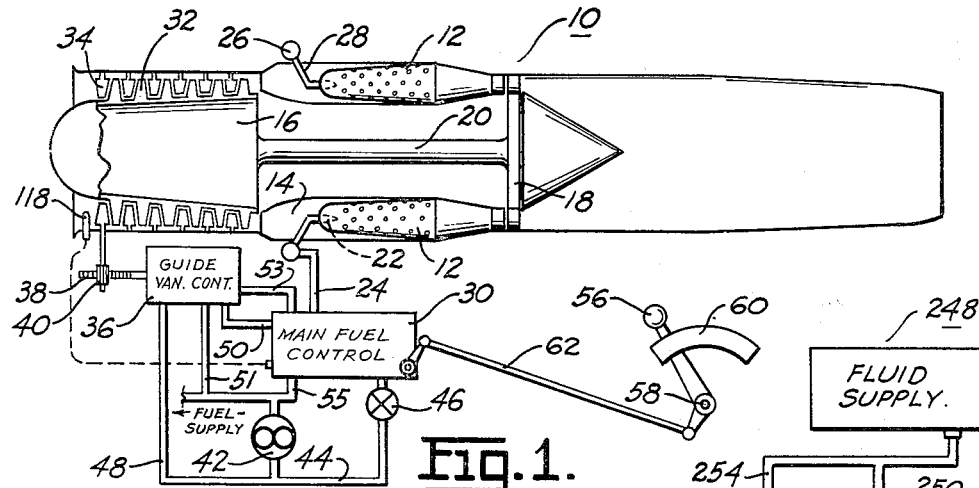

2,950,857

POWER CONTROL SYSTEM FOR GAS TURBINE ENGINES

Howard J. Williams and Francis R. Rogers, South Bend, Ind., assignors to The Bendix Corporation, a corporation of Delaware Filed Dec. 22, 1955, Ser. No. 554,695

8 Claims. (Cl. 230—114)

The present invention relates to gas turbine engines and more particularly to a control system for gas turbine engines adapted for the propulsion of aircraft such as turbo-jet and turbo-prop engines.

It is well known that during an acceleration of a gas turbine engine a phenomenon known as compressor surge or stall may be encountered in which the pressure ratio of the compressor exceeds some critical value at any given speed which usually results in a sudden and drastic reduction of compressor pressure ratio and air flow delivered or in sustained pulsations of these quantities. If such a condition is encountered the burner temperatures and the vibratory stresses induced in the compressor may become sufficiently high to cause serious damage to the engine unless the condition is alleviated by suitable power control action such as by an immediate and sharp reduction in the fuel delivery to the engine. In many present day high compression and high efficiency gas turbine engines, it has been found that the stall or surge characteristic of the engine compressor requires drastic limiting of the fuel flow supplied to the engine throughout the greater part of the range of the acceleration with a consequent major loss in otherwise available accelerating torque.

The tendency of the compressor to stall may be alleviated or greatly improved by varying the angles of the provided inlet or stator guide vanes of one of more compressor stages during operation of the engine in the critical ranges of speed in such a manner that the ratio of actual to tangential flow velocity is controlled to vary as required to minimize the stall condition. In this manner the relative velocity between any given rotor stage and the air flowing into said stage may be controlled so as to not exceed some maximum value.

The angles of the stator blades or one or more low pressure compressor stages may be controlled as a predetermined function of engine speed (N) and theta ($\theta$). Where theta is equal to the ratio of compressor inlet absolute total temperature to standard sea level absolute temperature. Guide vane angle control in accordance with a predetermined function of these parameters of engine operation enables the compressor to be throttled to a much greater degree than formerly without stall. In other words at any given critical engine speed the value of theta, a substantially higher compressor pressure ratio than formerly may be generated before stall becomes a problem. The overall effect of proper guide vane angle control enables a given engine to be accelerated through the critical ranges of speed at a substantially higher rate than heretofore and simplifies the fuel control problem.

In this respect and relative to the position of the compressor guide vanes when these vanes are in the open position, minimum restriction is applied to air entering the engine compressor section. When the inlet guide vanes are closed, the maximum restriction is applied to air entering the engine.

It is an object of the present invention to provide improved gas turbine engine control apparatus.

It is another object to provide improved control apparatus for a gas turbine engine having a compressor unit and inlet or stator guide vanes for controlling the operation of said compressor unit.

It is a different object to provide improved gas turbine engine control apparatus for controlling the air flow into the compressor of the engine such that the condition known as compressor stall or surge is thereby alleviated.

It is a further object to provide improved control apparatus for a gas turbine engine having a compressor unit and guide vanes for controlling the operation of that compressor unit, wherein the angular position of these guide vanes is controlled or adjusted as a function of one or more engine operational parameters.

It is an additional object to provide an improved control apparatus for a gas turbine engine having an axial compressor for minimizing the stall or surge characteristic of that compressor.

The foregoing and other objects and advantages of the present invention will become apparent in view of the following description taken in conjunction with the drawings wherein:

Figure 1 is a schematic view of a gas turbine engine having guide vane control apparatus, a main fuel control apparatus and a control throttle for governing the operation of the engine;

Figure 2 is a schematic diagram of the guide vane control apparatus shown in Figure 1 and a portion of the main fuel control apparatus; and Figure 3 is a modification of particularly the second control piston portion of Figure 2.

Referring now to Figure 1, a gas turbine engine 10 is shown including a series of annularly disposed combustion chambers 12 mounted in a casing having a header or air intake section 14 and a compressor 16 which is driven by means of a turbine unit 18 through a drive shaft 20. Each of the combustion chambers 12 is provided with a burner nozzle 22 to which metered fuel is supplied under pressure by way of a conduit 24, a fuel manifold 26 and individual fuel lines 28. The fuel conduit 24 receives metered fuel from a main fuel control device 30. The compressor 16 is of the axial flow type and includes a plurality of bladed rotor sections or stages 32 mounted on the rotor of the compressor 16 and a plurality of guide vanes or stator stages 34 mounted on the compressor housing and cooperating with each adjacent rotor stage for controlling the direction of air flow thereto. The angular position of the guide vanes or stator stages 34 is controlled by an inlet guide vane control apparatus 36 which operates through a rack 38 and cooperating pinion 40 to control the angular position of the guide vanes 34.

The main fuel control apparatus 30 receives fuel from the main fuel pump 42 through a fuel conduit 44 and a throttling control valve 46. The guide vane control apparatus 36 receives control fuel from the fuel pump 42 at pressure $P_1$ through a fuel conduit 48. Control fuel at servo pressure $P_X$ for the guide vane control apparatus 36 is received from the main fuel control apparatus 30 through a fuel conduit 50. Control fluid at pressure $P_0$ is supplied through conduit 51 to the guide vane control 36 and through conduit 55 to the main fuel control 30, and control fluid at servo regulator pressure $P_R$ is supplied through conduit 53 to the guide vane control 36. A pilot's control lever 56 is provided and is mounted for rotation on a shaft 58 in a pilot's control quadrant 60 and which is connected to the main fuel control apparatus 30 by means of a linkage connection 62.

Referring to Figure 2 there is shown a speed sensitive weight member 70 which pivots about a support shaft 72 to control the position of a control lever 74 through a connecting arm 76. The control lever 74 pivots about support point 78 to compress a spring member 80 which is connected between the control lever 74 and a speed piston 82 and further the control lever 74 determines the position of a servo control valve or half-ball 84 that in turn determines the pressure of control fuel within the fuel chamber 86. A fuel conduit 88 supplies control fuel at pressure $P_R$ through a servo orifice 90 to the fuel chamber 86. The speed piston 82 is controlled by the fluid pressure in chamber 86 and has one end connected to a rack 92 which is operative with a pinion member 94 to rotate the support shaft 96. The latter shaft 96 carries a guide vane control cam 98 and the well known acceleration control cam 100. The axial position of the shaft 96 is determined by a temperature responsive piston member 102. A compression spring member 104 biases the axial position of the support shaft 96 and is compressed between a flange member 106 connected to the shaft 96 and a support 108 for the shaft 96. The temperature responsive piston member 102 is responsive to fuel pressure within the fuel chamber 110 which pressure is determined by the control half-ball or servo pilot valve member 112 in cooperation with the servo seat provided by one end of the temperature responsive piston member 102. The position of the servo control valve 112 is determined by a temperature responsive bellows member 114 connected through a linkage 116 and responsive to a temperature probe 118 positioned at the inlet to the gas turbine engine 10 as shown in Figure 1. The fuel chamber 110 is supplied control fuel at pressure $P_X$ through a servo orifice 120 from a fuel conduit 122 containing control fuel at pressure $P_R$.

A cam follower member 124 is pivoted about support shaft 125 and is connected between the guide vane control cam 98 and a servo control valve 126, which latter valve 126 controls the pressure of control fuel within a fuel chamber 128. The seat of the servo control valve 126 is a part of the guide vane control servo piston 130 and moves as the latter piston moves. This piston 130 receives at is upper side a net force resulting from the combined effects of the loading spring 133 and the pressure of control fuel at pressure $P_0$ which is the inlet pressure of the fuel pump 42 and on the other side the guide vane servo piston receives a force resulting from control fuel at pressure $P_X$ within the fuel chamber 128. The latter control fuel is supplied to the fuel chamber 128 through a servo bleed orifice 132 from a fuel conduit 134 supplied with control fuel at pressure $P_R$ from the servo pressure regulator unit 136 through the fluid conduit 122. The latter pressure regulator unit 136 is a well known type of servo regulator and is supplied control fuel at pressure $P_1$ through the fuel conduit 138 and operates against the compression force of the spring member 140 to supply control fuel at substantially constant pressure $P_R$ to the fuel conduit 122. It should be here noted that the fluid conduit 88 is also connected to control fluid at pressure $P_R$ within the fluid conduit 122.

The servo control fuel pressure $P_X$ within the fuel chamber 128 is supplied through fuel conduit 50 and an adjustable control orifice 158 to a fuel chamber 160 at a first side of a control diaphragm member 162 to move the latter member 162 in a first direction. Control fuel at pressure $P_0$ is supplied to the second side of the control diaphragm member 162 and within the fuel chamber 164 to move the latter member 162 in conjunction with tension spring 161 in a second and opposite direction. The resultant movement of the control diaphragm member 162 is applied through a control lever 166 which pivots about connection point 168 to determine the position of a servo control valve 170. A tension spring member 172 is connected between the control lever 166 and a first output piston member 174 such that the control lever 166 is retained against the servo control valve 170. The latter servo control valve 170 determines the servo fuel pressure within a fuel chamber 176 to which control fuel is supplied from fuel conduit 53 containing control fuel at pressure $P_R$ through a servo bleed orifice 180 to move the piston member 174 against tension spring 181. The movement or resultant position of the first control piston 174 is applied through a first connecting control arm 182 and a second control lever 184 to determine the position of another servo control valve 186 which controls the fuel pressure within a servo fuel chamber 188 and at a first side of a second control piston 190. The second control lever 184 is pivotally connected to the second control piston 190 at pivot connection 191. A compression spring 189 is also provided at the first side of the latter piston 190. A fuel chamber 192 at the second side of the second control piston 190 is supplied control fuel at pressure $P_1$ through the fuel conduit 48. A servo bleed orifice 196 is provided within the second control piston 190 for supplying control fuel at suitable servo pressure to the fuel chamber 188. The movement or position of the second control piston 190 is connected or applied through a rack 38 and pinion 40 to control the position of a guide vane member 34 (as shown in Figure 1). The main metering valve 204 shown in Figure 2 is included as part of the main fuel control 30 shown in Figure 1 and corresponds in structure and function to the corresponding main metering valve and main fuel control apparatus shown in the copending application Serial No. 499,432, filed April 5, 1955 in the names of H. J. Williams, F. R. Rogers and B. J. Ryder and assigned to the same assignee as the present application.

In Figure 3 there is shown a modification of a portion of the apparatus shown in Figure 2, and more particularly the second control piston portion of Figure 2. In Figure 3 there is shown a separate source of control fluid 248 and a fluid pump 250 operative with the latter source to supply some control fluid, such as oil, through fluid conduit 252 to the fluid chamber 192. The second control piston 190 contains a servo orifice 196 leading to the servo fluid chamber 188. The servo control valve or half-ball 186 controls the fluid pressure within the fluid chamber 188 to thereby control the position of the second control piston 190 and hence to control the angular position of the guide vane 34 relative to the main direction of air flow through the engine 10. Fluid conduit 254 is operative to return fluid from the fluid chamber 256 to the inlet side of the fluid pump 250.

In the operation of the apparatus shown in Figures 1 and 2 the engine speed and the temperature signals are transmitted to the guide vanes setting cam follower 124 by the guide vane control cam 98. This cam is three dimensional and is operative in the same manner as the acceleration cam 100. It is positioned rotationally by the engine speed through the operation of the speed piston 82 and is positioned axially by the compressor inlet temperature responsive piston member 102. The cam follower 124 controls the position of the servo control valve 126 which is operative with its valve seat to control the fuel pressure within the fuel chamber 128. The seat of the servo control valve 126 is a part of the guide vane servo piston 130 and moves as the piston moves. When piston 130 is static or not moving the force urging said piston upwardly due to $P_X$ pressure fluid in chamber 128 is balanced by the forces due to spring 133 and $P_0$ pressure fluid in chamber 131 which urge said piston downwardly. As piston 130 is moved upwardly in response to cam 98, spring 133 is compressed causing a larger force to be imposed on the upper surface of piston 130 which will be balanced out by a larger $P_X$ pressure in chamber 128. Downward movement of piston 130 would cause a lesser force to be applied by spring 133 and thus require a lesser $P_X$ pressure in chamber 128 to effect a force balance. Thus the position of piston 130 which varies with cam 98, determines the force applied by spring 133 and thus in turn the $P_X$ pressure in chamber 128 which is necessary to balance the forces acting on said piston such that the value of $P_X$ pressure will be directly responsive to the variations in the contour of cam 98 to produce a fluid output signal.

The resultant servo control fluid pressure within the fuel chamber 128 is passed through the fuel conduit 50 into the fuel chamber 160 where it causes the diaphragm member 162 to have an output which is supplied to the servo control valve 170 to actuate the first output piston member 174 and then to actuate the second output piston member 190 through the second servo control valve 186 to thereby position the guide vanes 34 as a function of the fluid pressure within the fluid chamber 128.

The engine inlet guide vanes 34 are maintained in the closed position during start and idle operation of the engine, and do not begin to open until approximately 4800 engine r.p.m. They then continue to open until they are fully opened at an engine speed at approximately 6720 r.p.m. on a standard day. The opening and closing points of the inlet guide vanes can be altered as the compressor inlet temperature changes. This is accomplished by the compressor inlet temperature control piston 102 repositioning the inlet guide vane cam 98 axially as the temperature changes. This cam is three dimensional, having a contoured surface, and is positioned as a function of temperature as well as speed. Also, in this respect, the guide vanes are considered closed when they are at a maximum angular position relative to the air flow through the engine; in actual practice this corresponds to an angular position of about 32 degrees. The guide vanes are considered to be in an open position when they are substantially parallel to the air flow through the engine.

As the engine speed is increased from idle to military, and assuming a constant compressor inlet air temperature, the increasing speed will result in a change in the rotational position of the control cam 98. As speed increases, progressively lower cam contour will be presented to the cam follower 124. The motion of the cam follower 124 transmitted through the closing of the servo control valve 126 will move the guide vane servo piston 130 against the control fuel at pressure $P_0$ within the fuel chamber 131. This will increase the fluid pressure of the control fuel at pressure $P_X$ within the fuel chamber 128. This increased fuel pressure is transmitted through the first output piston 174 and the second output piston 190 to move the guide vanes 34 in an opening direction. Reducing engine speed will have the opposite effect.

The above description holds true for a constant ambient temperature at the engine compressor inlet. Now assuming that engine speed has stabilized at some steady state value within the range of guide vane operation, a change in ambient air temperature results in the following. An increase in ambient air temperature will be sensed by the temperature responsive element 118 and will cause the cam shaft 96 to move axially to the right as shown in Figure 2. This action will present a higher cam rise to the cam follower 124 due to the contour of the guide vane control cam 98. The resultant action will be the opposite of that just described and will produce movement of the engine inlet guide vanes in a closing direction in response to increased inlet air temperature.

With reference to Figure 3, the provision of the separate source of control fluid 248 enables higher fluid pressures to be employed, if desired, for the actuation and control of the second control piston 190 for the angular positioning of the guide vane 34. The other components of the apparatus shown in Figure 3 operate in a manner similar to the apparatus shown in Figure 2.

It should be noted that the compressor guide vane control system is continuously operative to control the angular positions of the guide vanes 34 irrespective of whether the engine is being accelerated, decelerated or operating at an equilibrium condition.

As shown in Figure 1, there may be several stages of guide vanes 34. All of the guide vanes may be interconnected if desired, and the pinion member 40 may be operative to control one stage with certain of the other stages coupled to follow said one stage to various angular positions as may be desired.

Although only two preferred embodiments of the present invention have been schematically illustrated and described, it will be apparent to those skilled in the art that various changes in the structure and relative arrangement of parts may be made to suit individual requirements without departing from the spirit and scope of the present invention.

We claim:

1. In a control system for a gas turbine engine, said engine having a compressor and an adjustable compressor guide vane, first control means including a fluid pressure responsive device, said latter device being operatively connected to the compressor guide vane for adjusting the position of the latter guide vane for controlling the operation of said compressor, second control means including a servo fluid chamber and a servo control valve operative for controlling the pressure of the fluid within said servo chamber, third control means including a cam member having a predetermined contour surface and being positioned as a function of a predetermined engine operating parameter and operatively connected to said servo control valve for controlling said valve as a function of said engine operating parameter such that said fluid pressure varies as a function of said parameter, with said fluid pressure responsive device being operatively connected to said servo fluid chamber of the first control means for adjusting the position of said guide vane as a function of said parameter.

2. In a control system for a gas turbine engine, said engine including a compressor and adjustable compressor guide vanes, the combination of first control means including a fluid pressure responsive device, with said latter device being operatively connected to said compressor guide vanes for adjusting the position of said guide vanes to thereby control the operation of said compressor, second control means including a servo fluid chamber having an output signal in the form of a variable fluid pressure, said servo chamber including a servo control valve, third control means including a cam member having a predetermined control contour and being positioned as a function of the operational speed of said engine, with said cam member being operatively connected for controlling the position of said servo control valve such that said fluid pressure varies as a function of said engine speed, with said second control means being operatively connected to the first control means for controlling the operation of said compressor as a function of engine speed.

3. In a control system for a gas turbine engine, said engine including a compressor and adjustable compressor guide vanes, the combination of first control means including a fluid pressure responsive device, said device being operatively connected to said compressor guide vanes for adjusting the position of said guide vanes to thereby control the operation of said compressor, second control means including a servo chamber having an output signal in the form of a variable fluid pressure and a control member having a contour surface controlled in position as a function of a predetermined operating temperature of said engine, said servo chamber including a servo control valve operatively connected to said contour surface for controlling said valve and said fluid pressure as a function of said engine operating temperature, with said servo chamber of the second control means being operatively connected to the fluid pressure responsive device of the first control means for controlling the operation of said compressor as a function of said engine operating temperature.

4. In a control system for a gas turbine engine, said engine including a compressor and adjustable compressor guide vanes for controlling the operation of said compressor, the combination of first control means including a fluid pressure responsive device, said device being operatively connected to adjust the position of said compressor guide vanes, second control means including a servo fluid chamber having an output signal in the form of a variable fluid pressure and a fluid pressure controlling cam member having a contour surface movable in a first direction as a function of engine speed and movable in a second direction as a function of an engine operating temperature, said servo chamber including a servo control valve positioned by said contour surface as a function of said engine speed and as a function of said operating temperature, such that said fluid pressure varies as a function of engine speed and said operating temperature, with the servo fluid chamber of the second control means being operatively connected to the fluid pressure responsive device of the first control means for controlling the operation of said compressor as a function of engine speed and said operating temperature.

5. In a control system for a gas turbine engine, said engine including a compressor and an adjustable compressor guide vane for controlling the operation of said compressor, first control means including a cam member having a contoured surface positioned as a function of an engine operating parameter, second control means including a cam follower responsive to the contoured surface of said cam member, said second control means further including a fluid chamber for providing a variable pressure fluid output signal, said fluid chamber including a pressure control member operatively connected to said cam follower, and third control means operatively connected to said compressor guide vane and including a pressure responsive device for adjusting the position of said compressor guide vane in response to said output signal of the second control means for controlling the operation of said compressor as a function of said engine operating parameter.

6. In a control system for a gas turbine engine, said engine including a compressor and an adjustable compressor guide vane for controlling the operation of said compressor, first control means including a cam member having a contoured surface positioned as a function of engine speed and as a function of a first temperature which varies in accordance with ambient temperature, second control means including a cam follow member responsive to the contoured surface of said cam member, said second control means further including a fluid chamber for providing a variable pressure fluid output signal, said fluid chamber including a pressure control member operatively connected to said cam follower member, and third control means operatively connected to said compressor guide vane and including a pressure responsive device for adjusting the position of said compressor guide vane in response to said output signal and as a function of engine speed and said first temperature.

7. In a control system for a gas turbine engine, said engine including a compressor and a compressor control member, first control means including a cam member having a contoured surface positioned as a function of an engine operating parameter, second control means including a cam follower member responsive to said contoured surface of the cam member, said second control means further including a servo fluid chamber for providing a variable pressure fluid output signal, said servo chamber including servo control valve which is operatively connected to said cam follower and thereby positioned as a function of said engine operating parameter, and third control means including an output piston member connected to said control member, said output piston member being responsive to said variable pressure fluid output signal of the second control means such that the compressor is controlled as a function of said engine operating parameter.

8. In a control system for a gas turbine engine, said engine including a compressor and a compressor guide vane, first control means including a cam member having a contoured surface positioned as a function of an engine operating parameter, second control means including a cam follower member responsive to said contoured surface, said second control means further including a servo fluid chamber for providing a variable pressure fluid output signal, said servo chamber having a servo control valve operatively connected to said cam follower for controlling said variable pressure fluid output signal as a function of said engine operating parameter, third control means including an output servo piston member connected to said compressor guide vane for controlling the operation of said compressor, said servo piston member being controlled by said output signal of the second control means for adjusting the position of said compressor guide vane as a function of said engine operating parameter.

References Cited in the file of this patent

UNITED STATES PATENTS

| 2,651,261 | Davies | Sept. 8, 1953 |
| 2,705,590 | Lovesey et al. | Apr. 5, 1955 |
| 2,759,549 | Best | Aug. 21, 1956 |
| 2,764,867 | Farkas | Oct. 2, 1956 |